2,723,919

PHOTOCHEMICAL MIRRORING PROCESS

Frank J. Pohnan, deceased, late of Riverside, Ill., by Mildred M. Jackson, administratrix, Riverside, Ill.

No Drawing. Application November 29, 1951,
Serial No. 259,017

3 Claims. (Cl. 117—35)

This invention relates to the formation of metallic deposits on surfaces. More particularly, this invention relates to the manufacture of mirrors by the deposition of metallic films from solutions. Still more particularly it relates to photochemical processes for the formation of metallic mirrors on hyaline surfaces.

Methods for the formation of mirrors by depositing a metallic film such as a film of silver, copper, gold, or lead on hyaline surfaces of glass, plastics and the like have been known for a considerable time. Generally, in commercial mirror making an ionic solution of the desired metal is prepared and an appropriate reducing agent is added thereto. The resulting solution is applied to a glass or other hyaline surface and the reduction is allowed to proceed until the desired metallic film has been deposited.

In particular, the formation of silver mirrors by similar methods is of great commercial importance. The standard procedure is to prepare an ammoniacal solution of silver nitrate by adding aqueous ammonia to an aqueous solution of silver nitrate. Various reducing agents such as cane sugar in the presence of potassium hydroxide, formaldehyde, Rochelle salt, or certain organic acids are then added. The composite solution is applied so as to cover a sheet of glass or other hyaline material supported in a shallow tray. As the silvering proceeds by the reduction of the silver and its consequent deposition, the surface can be examined to determine whether a film of sufficient thickness has been deposited. A lengthy exposure to air, however, can be injurious to the metallic surface.

Mirroring processes, and in particular silvering processes, can be performed with the solution at room temperature. In general, however, it has been found necessary to assist the reduction of the metal, and thereby increase the rate of deposition, by applying heat to the solution in some manner. This can be done, for example, by using steam coils placed beneath the mirroring trays.

Methods of improving mirroring processes, and especially improvements in processes for the production of silver mirrors have been diligently sought. These efforts have generally been directed toward accelerating the rate of deposition of the metallic film, which is a time consuming operation; and to producing more uniform films of finer grain structure, which will adhere more firmly to the hyaline surface. The importance of these features is readily appreciated when it is realized that it is desirable to produce mirror surfaces with high coefficients of reflection; and which do not produce any change of color by selective reflection of different wave lengths of light. Moreover, it is desirable to have mirror surfaces which can be repolished without excessive deterioration.

It is therefore an important object of this invention to achieve a substantial acceleration in the rate of deposition of metallic films on surfaces, particularly hyaline surfaces, and especially to accelerate the rate of formation of silver mirrors from solutions.

It is a further object of this invention to provide a method whereby metallic films can be rapidly formed on hyaline surfaces without the application of heat.

It is another object of this invention to form metallic films of more uniform and finer grain structure, and thereby produce mirrors with high coefficients of reflection, and without appreciable selective reflection.

It is a further object of this invention to produce metallic surfaces on mirrors which are thicker and adhere more firmly to the surface on which they are deposited in order that the mirrors will be long lasting, and can if desired be repolished.

The surprising discovery is that all of the above objects are substantially accomplished by this novel improvement in mirroring processes, which comprises subjecting the mirroring solution during reduction to radiation having a substantial quantity of its energy in wave lengths shorter than about 5000 Å. This process is advantageously carried out by first applying conventional mirroring solutions such as those containing silver, copper, gold, or lead together with an appropriate reducing agent to a hyaline surface according to the usual procedure. The mirroring solution is then subjected to bombardment with radiant energy having the greater portion of its energy in wave lengths shorter than about 5000 Å.

This invention is particularly effective in the commercial silvering of mirrors. It has been found that the highest quality of silver mirrors are produced by subjecting ammoniacal silver nitrate in conjunction with a reducing agent such as formaldehyde, Rochelle salt, cane sugar in the presence of potassium hydroxide, or an organic acid, to radiation of wave lengths predominantly in the region of the spectrum below about 5000 Å. These mirrors display in the superlative the desirable properties of fine and uniform grain structure, and firm adherence of the silver film to the surface on which it is deposited. Moreover, the total time of reduction and deposition is reduced by as much as 60%, as compared with the conventional process outlined above, while in addition no application of heat is required.

Without limiting the invention to any theory of operation, it appears that the efficacy of this new process stems from an almost catalytic effect which light quanta of certain wave lengths have upon the rate of deposition of metal on the surface which is being mirrored. The experiments show that as the wave length of ordinary visible radiation is decreased to a value approaching but larger than 5000 Å., the rate of deposition increases, but only by a relatively small amount. However, as the energy level of the light is increased by shortening the wave length thereof to about 5000 Å. or less, the rate of deposition increases markedly, and is especially pronounced in the region of the long ultra-violet, viz. from about 4000 Å. to 3200 Å. The effective working range of this invention extends to either side of the long ultra-violet region, however, and includes the blue, violet, ultra-violet and part of the X-ray portions of the spectrum, i. e. from about 5000 Å. to 180 Å.

In general, any artificial source of radiant energy can be used to provide the radiation for these improved processes, so long as they provide substantial quantities of radiant energy in wave lengths shorter than about 5000 Å. It is preferred, however, to utilize sources of radiant energy which emit over 50% of their energy in the ultra-violet region, such as the carbon arc, mercury arc, tungsten arc, and Kromeyer lamps. It has been found that mercury vapor lamps are especially desirable. It should be understood, however, that none of the commercially available sources of energy radiation at wave lengths shorter than 5000 Å. emit all their energy at one definite wave length or even in a narrow spectral band of wave lengths. Instead the output of each available source spreads over a considerable portion of the spectrum. Mercury vapor lamps, however, as stated above, are particularly desirable, tend to emit a few intense lines, superimposed on a weak continuous spectrum, and can be peaked at these intense lines.

This invention will be better appreciated by consideration of the following illustrative examples, which are based upon actual experience in carrying out mirroring processes in accordance with the invention, and in which many details are specified for the assistance of those desiring to practice the invention. It is to be distinctly understood, however, that such details are not to be construed as limitations upon the scope of the invention, except as they are defined in the appended claims.

*Example I*

A reducing solution was prepared by dissolving 1 ounce of granulated sugar in 10 ounces of water, adding 1 fluid ounce of pure grain alcohol and 24 drops of nitric acid to the resultant solution, boiling, and cooling. A silver solution was prepared by dissolving 1 ounce of silver nitrate in 10 ounces of water, adding ammonium hydroxide until a precipitate forms and redissolves, adding aqueous potassium hydroxide until a new precipitate forms, redissolving the precipitate by adding ammonium hydroxide, and thereafter adding aqueous silver nitrate in an amount sufficient to turn the color of the mixture to a light straw color.

Two parts by volume of the reducing solution were added to one part by volume of the silver solution to form a standard commercial silvering solution. This silvering solution was poured into a shallow pan until the top of a glass plate, prepared for silvering in the customary manner and supported therein, was covered with a thin layer of solution. A high pressure mercury vapor lamp of 100 watts input and peaked at about 3650 Å. was equipped with a nickel-cobalt filter so that its radiation would be substantially confined within the long ultraviolet region of the spectrum. This lamp equipped with a reflector was positioned at a distance of ten inches above the surface of the silvering solution, and its radiation was directed into the solution for five minutes. The lamp was then turned off and the plate was removed and dried.

Upon microscopic examination, and the performance of adherence tests, it was determined that the mirror had an unusually fine and uniform grain structure and that the films showed remarkable adherence properties. It was further determined that the mirror had a high coefficient of reflection, and did not display appreciable selective reflection.

*Example II*

Another glass plate was prepared for silvering in the manner described in Example I, using the identical ammoniacal silver nitrate solution, reducing agent, and equipment. A high pressure mercury vapor lamp of 100 watt input and peaked at about 3650 Å., but without a nickel-cobalt filter, was positioned at a distance of ten inches above the surface of the silvering solution. The radiation from this lamp with the assistance of a reflector was directed into the solution for five minutes. The lamp was then turned off and the plate was removed and dried. Upon the performance of the same tests described in Example I, it was determined that the mirror was of substantially the same quality as that produced in Example I.

*Example III*

Following the same method and using the same reactants as described in Examples I and II, a glass plate was prepared for silvering. A low pressure mercury vapor lamp of 15 watt input and delivering approximately 90% of its energy at about 2537 Å. was positioned at a distance of ten inches above the surface of the silvering solution. The solution was then subjected with the use of a reflector to radiation from this lamp for five minutes, after which time the mirror was removed and dried. Upon performance of the same tests described in Examples I and II it was determined that the mirror was of exceptionally high quality, although not quite as superior to ordinary mirrors as the mirrors produced in Examples I and II.

*Example IV*

The effectiveness of radiation, the wave lengths of which are longer than ultraviolet light, was determined by repeating the experiment of Example III using 15 watt, 12 inch fluorescent tubes as the source of radiation. A five minute exposure from a distance of three inches induced no deposit when a fluorescent tube yielding green light was employed. On the other hand, when a tube that gave off blue light was used under the same conditions, a slight deposit of silver was obtained on the surface of the glass. Since 5000 Å. is approximately the wave length that divides blue from green light, it can be seen from this and the foregoing examples that it is only light having a substantial portion of energy in wave lengths shorter than about 5000 Å. that is useful in the process of this invention.

*Example V*

The effectiveness of radiation, the wave lengths of which are shorter than ultraviolet, was tested by repeating the experiment of Example III using X-rays generated by 100 kv., 10 ma., and by 220 kv., 20 ma. tubes. The X-rays emitted by the lower voltage tube caused no deposit to form after 5 minutes; whereas the X-rays from the higher voltage tube brought about a good deposit during an exposure of 5 minutes from a distance of 12 inches.

These experiments show that as the wave length of the radiant energy used in the process becomes substantially shorter than that of ultraviolet light, the effectiveness decreases. Radiation with a wave length of about 180 Å. is the practical lower limit that can be used in the process.

*Example VI*

It is known that infrared radiation will, by means of the heat generated thereby, cause deposition of films from mirroring solutions. In order to make a comparison between this method and the method of the present invention, the experiment of Example II was repeated using a 250 watt infrared lamp. A comparison of the film thus formed with the film produced in Example II showed that the latter film was heavier, more uniform, and had a finer grain deposit, despite the fact that the electrical energy input of the infrared lamp was 2.5 times greater than that of the mercury vapor lamp. Micro-photographs clearly showed the more uniform character and the finer grain structure of the deposit made by irradiation of the silvering solution with the ultraviolet light.

The foregoing concrete examples considered together with the discussion herein will enable those skilled in the art to practice the photochemical processes of this invention for forming metallic mirrors, in particular, and metallic deposits on any suitable surface, in general. Having thus described and illustrated the invention, what is claimed is:

1. The photochemical process of forming silver mirrors which comprises covering a hyaline surface with a solution of ammoniacal silver nitrate containing a reducing agent, and thereafter subjecting the said solution to radiation controlled to contain a major portion of its energy in wave lengths between 5000Å. and 180Å.

2. A process of forming a metallic deposit on a surface which comprises submerging the surface to be mirrored in a solution of ammoniacal silver nitrate containing a reducing agent, and thereafter subjecting the said solution to radiation controlled to contain a major portion of its energy in wave lengths between 5000Å and 180Å. for a time sufficient to form a metallic deposit on said surface.

3. The photochemical process of forming metallic mirrors which comprises submerging a hyaline surface in a metal depositing solution comprising an ammoniacal solution of nitrates selected from the class consisting of silver, gold, copper and lead nitrates, containing a reducing agent, and subjecting the applied mirroring solution to radiation controlled to contain a major portion of its energy in wave lengths between 5000Å. and 180Å.

References Cited in the file of this patent

UNITED STATES PATENTS

| | | |
|---|---|---|
| 2,327,723 | Levaggi | Aug. 24, 1943 |
| 2,453,770 | Wendt | Nov. 16, 1948 |